United States Patent [19]

Pierce

[11] Patent Number: 5,335,932
[45] Date of Patent: Aug. 9, 1994

[54] APPARATUS FOR MOUNTING A TRAILING ARM AIR SUSPENSION TO A SLIDING FRAME

[75] Inventor: William C. Pierce, Muskegon, Mich.
[73] Assignee: Nai Neway, Inc., Muskegon, Mich.
[21] Appl. No.: 905,269
[22] Filed: Jun. 26, 1992
[51] Int. Cl.⁵ .......................................... B62D 21/11
[52] U.S. Cl. .................. 280/788; 280/405.1; 280/713
[58] Field of Search ............. 280/788, 781, 688, 713, 280/711, 702, 405.1, 406.1, 676, 682, 683, 149.2

[56] References Cited

U.S. PATENT DOCUMENTS

| | | |
|---|---|---|
| Re. 30,308 | 6/1980 | Masser . |
| 4,756,550 | 7/1988 | Raidel ............................ 280/713 |
| 4,877,293 | 10/1989 | French et al. . |
| 4,958,845 | 9/1990 | Parks .......................... 280/405.1 |
| 5,088,763 | 2/1992 | Galazin ........................... 280/788 |

FOREIGN PATENT DOCUMENTS

| | | |
|---|---|---|
| 315606 | 5/1989 | European Pat. Off. ............ 280/781 |
| 896181 | 5/1962 | United Kingdom . |

Primary Examiner—Karin L. Tyson
Attorney, Agent, or Firm—Varnum, Riddering, Schmidt & Howlett

[57] ABSTRACT

An improvement is provided for connecting an air-spring suspension to the subframe of a slider comprising parallel frame rails. A beam is disposed beneath and extends between the frame rails and is suspended therefrom by three platelike gussets. Hanger brackets for trailing arms depend from a bottom surface of the beam. Support brackets are also provided for mounting air springs adapted to cushion the swinging movement of the trailing arms.

17 Claims, 9 Drawing Sheets

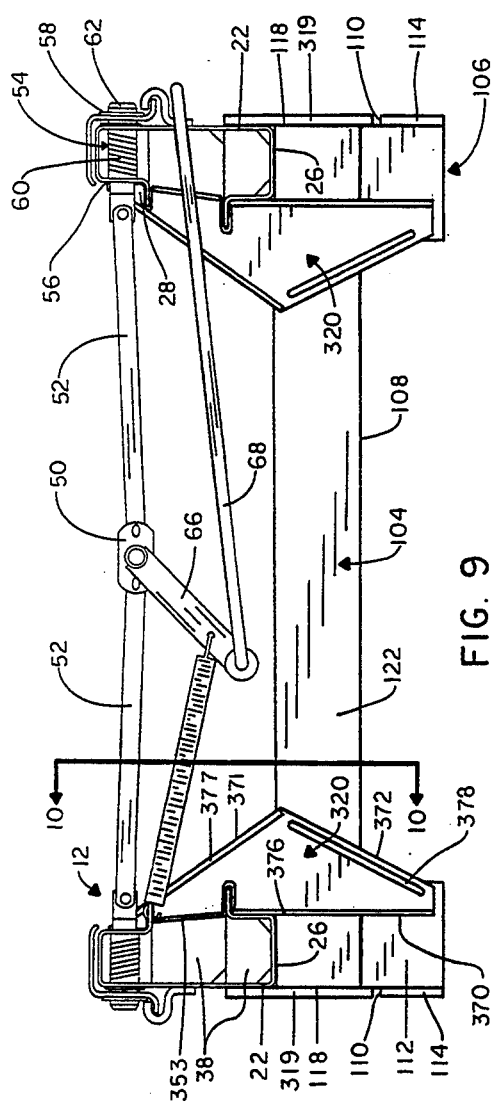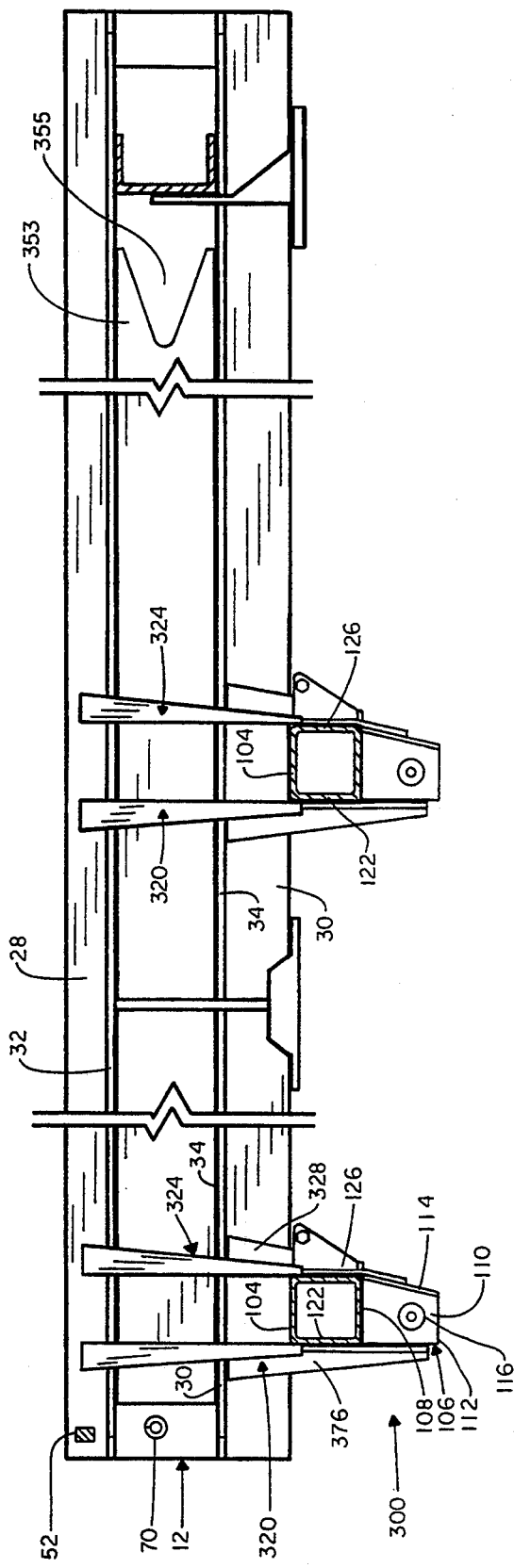

APPARATUS FOR MOUNTING A TRAILING ARM AIR SUSPENSION TO A SLIDING FRAME

BACKGROUND OF THE INVENTION

1. Field of the Invention

This invention relates to slidable suspensions for trailers and more particularly to an apparatus for attaching a trailing arm air spring suspension to a sliding frame.

2. Scope of the Prior Art

Sliders are frequently used with truck trailers where it is desirable to adjust the space between the trailer axles and the drive axles on the tractor. Typically, the trailer is formed with a structural boxlike container. Unlike conventional trailers, there is no frame beneath the container. Rigidity is achieved through the construction of the container. A pair of rails are mounted at a rear portion of the trailer, and the slider is mounted to the rails for slidable movement in a fore and aft direction. The slider includes a subframe with axles and wheels suspended from the subframe. When the slider and its suspension is moved in the aft direction, the spacing between the trailer axles and the drive axles on the tractor is increased. Conversely, when the slider is moved in the forward direction, the spacing is decreased.

Typically, sliders utilize leaf springs to suspend the axles from the subframe. Leaf spring suspensions are considerably less expensive and lighter in weight than air suspensions which include a pivotable trailing arm and an air spring. However, the ride provided by a leaf spring suspension tends to be relatively harsh which negatively affects vehicle durability, promotes cargo damage, and adversely affects the control of the tractor and trailer. To a lesser degree, air spring suspensions are used on slidable trailers. Air spring suspensions provide a smoother ride and improve the control of the tractor and trailer. However, a typical air spring suspension has less connections for conducting lateral forces to the subframe than a leaf spring suspension. Thus, more stress is placed on the connections for an air spring suspension. Prior solutions to the problem have been directed at providing heavier-weight metal and strengthening rigid connections between the air spring suspension and the frame.

SUMMARY OF THE INVENTION

The invention is directed to an improvement in a slider suspension comprising a subframe and a trailing arm air-spring suspension. The subframe typically has a pair of parallel frame rails with each frame rail having an outer wall and an inner wall. A connection means is provided to connect the suspension to the subframe. The improvement, according to the invention, is in the connection means and comprises a beam disposed beneath the frame rails and extending from the outer wall of one frame rail to the outer wall of the other frame rail. The beam has a front surface, a bottom surface, and an end, and the beam is so disposed that the end is substantially coplanar with the outer wall of one of the frame rails.

A hanger bracket is mounted to the bottom surface of the beam and is adapted to pivotably mount the trailing arm. A first gusset is mounted to the front surface of the beam, the hanger bracket, and the inner wall of the frame rail. A second gusset is mounted to the end of the beam, the hanger bracket, and the outer wall of the frame rail. Thus, the first and second gussets are adapted to transfer loads between the subframe and the suspension.

Preferably, the box beam also has a rearward surface, and a third gusset is mounted to the rearward surface of the beam, the hanger bracket, and the inner wall of the one frame rail. Thus, the beam is suspended from the frame rail by the first, second, and third gussets.

The first and third gussets are preferably triangular in shape. The first gusset has first, second, and third edges, with the first edge extending from the inner wall toward the hanger bracket, the second edge extending from the hanger bracket toward a point on the front surface of the beam, and the third edge extending from the point on the front surface toward the inner wall. Similarly, the third gusset has first, second, and third edges, with the first edge extending from the inner wall toward the hanger bracket, the second edge extending from the hanger bracket toward a point on the rearward surface of the beam, and the third edge extending from the point on the rearward surface toward the inner wall.

Preferably, the second gusset is platelike with the gusset being coplanar with the outer wall and having an upper portion, an intermediate portion, and a lower portion. The upper portion is connected to the outer wall, the intermediate portion is connected to the end of the beam, and the lower portion is connected to the hanger bracket. All connections are typically attached with short weldments.

It is also preferable that a flange extend normally from the first edge of the first and third gussets, and that a flange extend normally from the third edge of the first and third gussets. A rib will also extend near to and substantially parallel with the second edge of the first gusset.

BRIEF DESCRIPTION OF THE DRAWINGS

The invention will now be described with reference to the following drawings in which:

FIG. 9 is a front view of the slider of FIG. 8 taken along lines 9—9 thereof;

FIG. 10 is an elevational view of the slider of FIGS. 8 and 9 taken along lines 10—10 of FIG. 9;

DETAILED DESCRIPTION OF THE PREFERRED EMBODIMENTS

Figure 1:
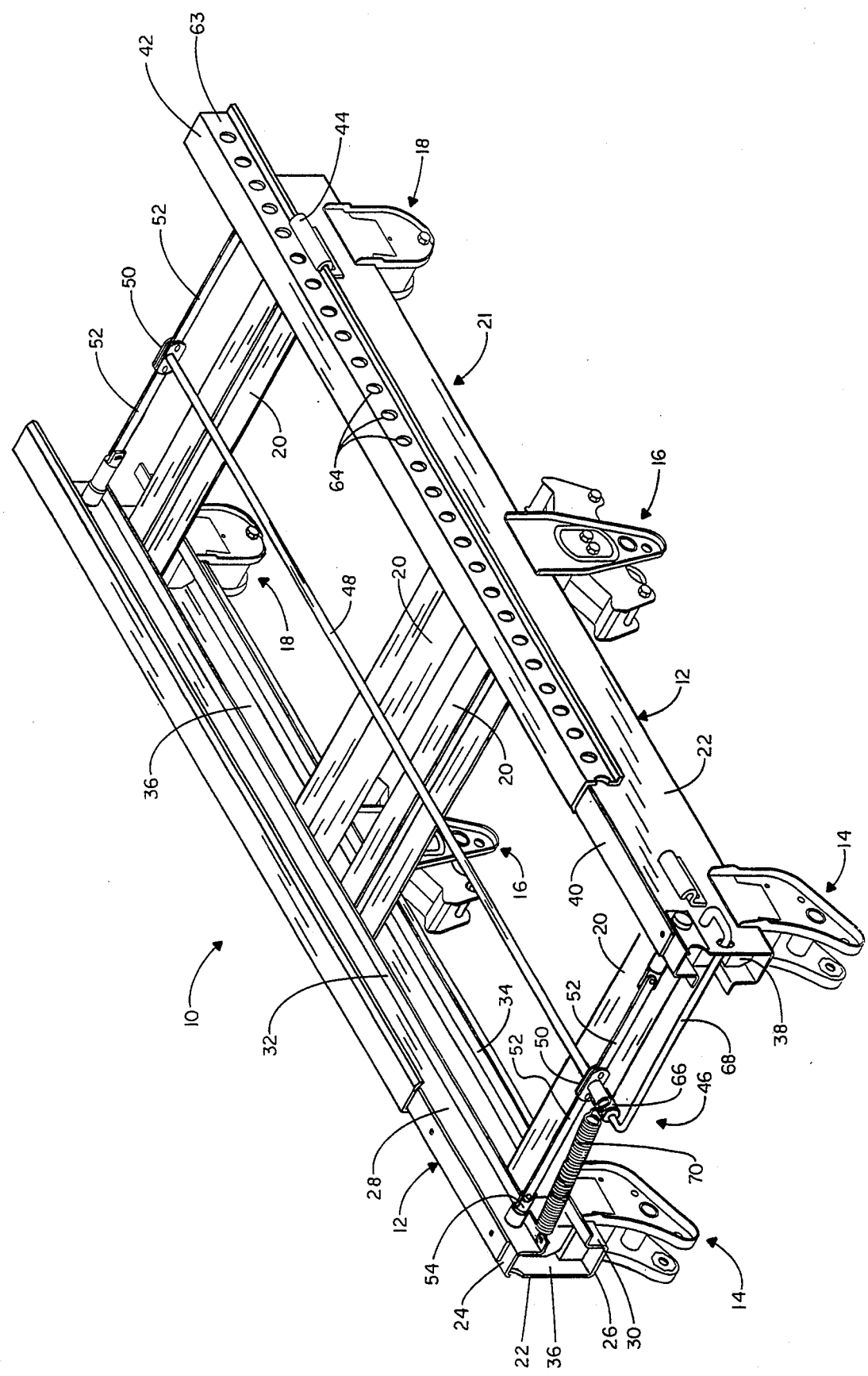
FIG. 1 is an isometric view of a prior art subframe of a slider with mounting brackets for a leaf spring suspension.

Pertinent portions of a conventional slider of the prior art are illustrated in FIG. 1. The illustrated embodiment is similar to a Model H-8800 slider assembly sold by Hutchens Industries, 215 North Patterson, Springfield, Miss. 65802. It can be seen that a slider 10 is adapted for use with a leaf spring-type suspension (not shown) in a manner well known in the art. The slider 10 comprises a pair of spaced frame rails 12 from which depend several sets of hanger brackets, disposed as a pair of front hanger brackets 14, a pair of center hanger brackets 16, and a pair of rear hanger brackets 18. The hanger brackets 14, 16, 18 are typically welded to the frame rails 12. Cross beams 20 are mounted to and between the frame rails 12 to form a subframe 21. Each frame rail 12 has a vertical side wall 22 disposed to define a side of the subframe 21. Each frame rail 12 also includes a top wall 24 and a bottom wall 26, each extending at approximately right angles from its corresponding side wall 22 and toward the oppositely disposed frame rail 12. An upper flange 28 depends from the top wall 24, and a lower flange 30 extends upwardly from the bottom wall 26. Each flange 28, 30 terminates in an upper lip 32 and a lower lip 34, respectively. Each frame rail 12 thus defines an open channel 36. The cross beams 20 extend into the channel 36 in each frame rail 12 and are welded to the interior surface of the side wall 22. -Spacer brackets 38 are also provided within the channel 36 to provide strength and rigidity to the slider 10.

A slider pad 40 is mounted to the upper surface of each top wall 24. A body rail 42 is received over the slider pad 40 and held in place for sliding movement thereon by hold-down clips 44. Although only one body rail 42 is shown in FIG. 1 for clarity, it will be understood that each frame rail 12 includes a body rail 42 for sliding movement thereon. The body rails 42 are adapted to be securely mounted to the underside of a boxlike container (see FIG. 7 for example) having sufficient structural rigidity to function as a trailer in a tractor-trailer combination. It can be seen that the subframe 21 slides relative to the body rails 42, and thus relative to a trailer compartment to which the body rails are secured.

The body rails 42 can be locked in a fixed position relative to the subframe 21 by a locking pin mechanism 46. The mechanism 46 comprises an elongated rod 48 disposed intermediate the frame rails 12 and generally parallel thereto. A cam 50 is mounted to each end of the rod 48 and a pair of links 52 extends from each cam toward a respective frame rail 12. A lock pin 54 is pivotably connected to each link 52. Looking now also at FIG. 4, briefly, it will be seen that an aperture 56 is located in the upper flange 28 at each end of each frame rail 12, and another aperture 58 is located in the side wall 22 at each end of each frame rail. The two apertures 56, 58 are in registry so that at each end of each frame rail, the lock pin 54 can project through the two apertures and outwardly of the side wall 22. A compression spring 60 is disposed within the channel 36 and surrounds the portion of the lock pin 54 between the two apertures. One end of the spring 60 bears against the interior surface of the upper flange 28, and the other end of the spring bears against a head 62 of the lock pin 54. Thus, each lock pin 54 is biased toward a position where at least a portion of the head 62 extends outwardly of the side wall 22. Referring again to FIG. 1, each body rail 42 has a flange 63 disposed adjacent the side wall 22 of the corresponding frame rail 12, and each flange 63 contains a plurality of holes 64. The holes 64 are located so as to progressively come into registry with the apertures 56, 58 as the body rail 42 slides on the frame rail 12. It will be apparent that the lock pins 54 extend through the holes 64 in registry therewith to lock the body rails 42 in a predetermined position relative to the subframe 21.

A crank 66 is mounted to the rod 48 for rotation therewith, and a handle 68 is pivotably mounted to the crank 66. The handle typically extends through one of the side walls 22 for accessibility from outside the slider 10. A spring 70 extends between the crank 66 and the rail 12 away from the handle 68 to bias the crank and the rod 48 to a position where the lock pins 54 engage the body rails 42. It will be apparent that pulling handle 68 outwardly of the slider 10 will release the lock pins 54 from engagement with the body rails 42, whereupon the rails may be moved to a new position. The bias of the springs 70 and 60 tend to move the lock pins 54 toward engagement with the body rails 42 when the handle 68 is released.

Figure 2:
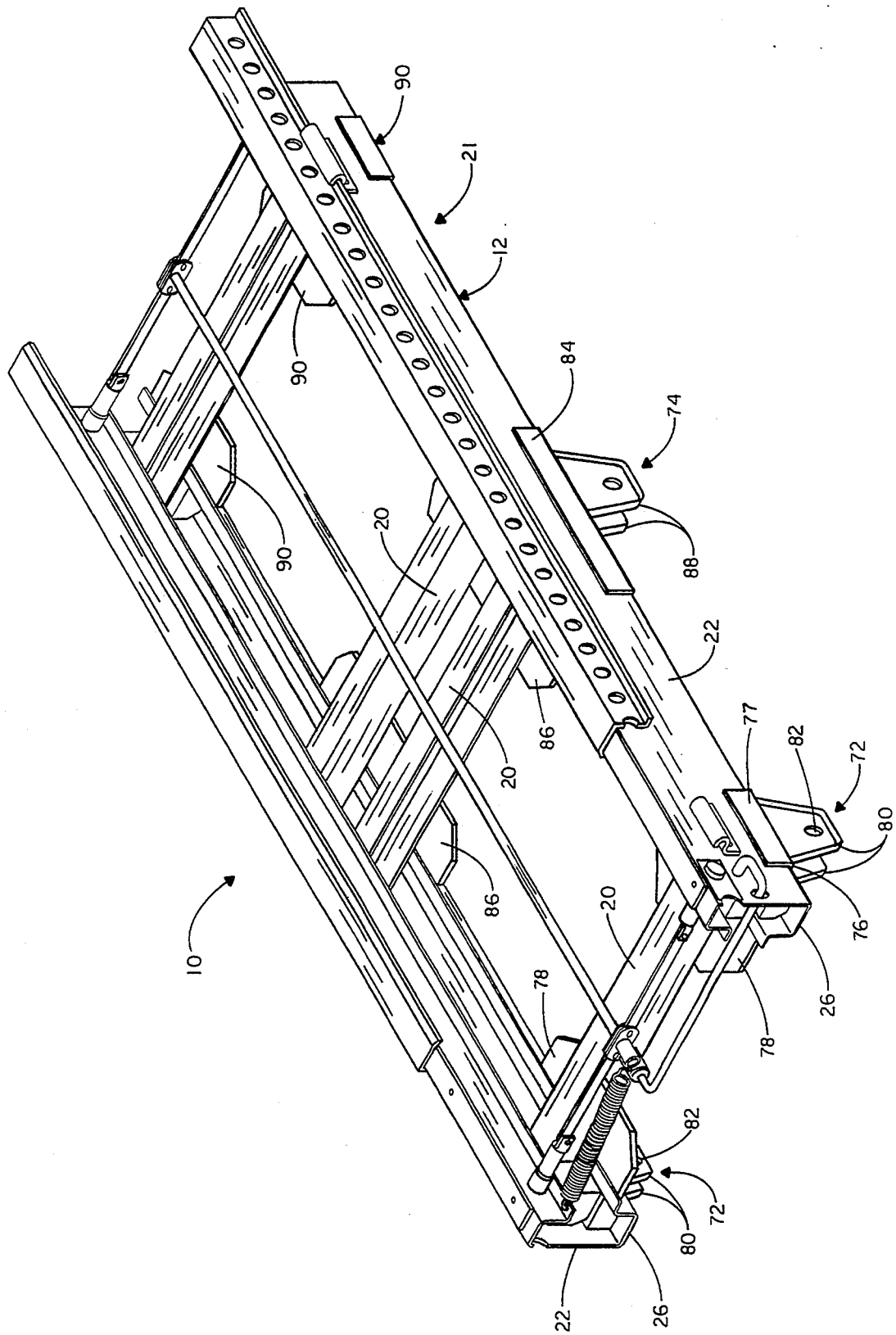
FIG. 2 is an isometric view of a prior art subframe for a slider with mounting brackets for a trailing arm air suspension.

It is known to adapt the slider 10 of FIG. 1 for use with trailing arm air suspensions. FIG. 2 illustrates an embodiment of a slider 10 of the prior art adapted for mounting a trailing arm air suspension. In this embodiment, as with all subsequent embodiments, like elements will be identified with like numerals. It can be seen that the slider 10 of the trailing arm embodiment of FIG. 2 is essentially the same as the slider 10 of the leaf spring embodiment of FIG. 1 except for the material thickness, the hanger brackets and the respective mounting structure. In FIG. 2, the slider 10 includes a forward hanger bracket 72 and a rearward hanger bracket 74. The forward hanger bracket 72 includes a mounting plate 76 which is welded to the bottom wall 26 of the frame rail 12. The mounting plate 76 may include a portion 77 extending upwardly adjacent the side wall 22 and welded thereto. The mounting plate 76 further includes a support bracket 78 which extends inwardly of the frame rails 12 and is welded or otherwise secured to a cross beam 20. Two spaced arms 80 depend from and are welded to the mounting plate 76. The arms 80 may be integral with the web portion of a U-shaped bracket which is likewise welded to the mounting plate 76. The arms 80 include apertures 82 in registry with each other, and which are adapted to receive a bushed connection for a trailing arm in a conventional manner.

The rearward hanger bracket 74, in a similar manner, includes a mounting plate 84, a support bracket 86, and a pair of depending arms 88. However, the mounting plate 84 and the support bracket 86 extend forwardly of the rearward hanger bracket 74 to provide an upper support for the air spring which is normally disposed in a conventional manner between the forward trailing arm and the frame rail 12. Typically, the air spring is disposed on a centerline which is located inwardly of the frame rail 12 so that the upward force of the free end of the forward trailing arm is borne directly by the support bracket 86 and then translated to the cross beams 20 and the frame rails 12. Support brackets 90 are provided rearwardly of the rearward hanger bracket 74 to provide similar support to the air spring associated with the rearward trailing arm.

In normal operation of the slider 10, substantial vertical and lateral forces are placed upon the suspension. Frequently, as the trailer moves over uneven ground, loads are placed on the axles of the wheels which causes uneven forces to be translated through the trailing arms to the subframe 21. This uneven force, in turn, tends to cause the slider 10 to flex and introduces large lateral forces to the subframe 21. Similarly, as the vehicle negotiates a turn or curve, large lateral (centrifugal) forces are placed on the suspension. It can be seen-that in the embodiment of FIG. 2, four connections are provided between the suspension and the subframe for distributing vertical loads for each frame rail 12, i.e., the brackets 72, 74 (for connecting the trailing arms) and the support brackets 86, 90 (for connecting the air springs). However, where the leaf spring suspension of FIG. 1 has six lateral inputs into the subframe 21 (the six hanger brackets 14, 16, 18), prior art trailing air suspension systems such as the embodiment of FIG. 2 have only four lateral inputs into the frame, i.e., the hanger brackets 72, 74. An air spring provides virtually no resistance to lateral forces. Thus, the connection between each hanger bracket 72, 74 and the frame rails 12 is subjected to higher stress than that of a leaf spring suspension. Additional structural support will maintain the integrity of the frame rails 12 and associated components of FIG. 2. Heretofore, the reinforcing plates 77, 84 and the support brackets 78, 86, and 90 were made of relatively heavy and thick steel to resist excessive lateral forces. Sometimes, additional stiffener braces were often disposed between opposing hanger brackets. This heavier weight made the costs of trailing arm air suspension slider packages uncompetitive with leaf spring suspension slider packages and increased the empty vehicle weight.

An improved slider 10 according to the invention is illustrated in FIGS. 3 through 7. It can be seen in FIG. 3 that the subframe 21 is essentially the same as the subframe 21 of the prior art, but the means for supporting the trailing arm air suspension is significantly different. The means basically comprises a hanger bracket assembly 100 and an air spring bracket 102. Each axle (not shown) requires a pair of hanger bracket assemblies 100 and a pair of air spring brackets 102. In the embodiment shown, the slider 10 is adapted to support two axles.

Figure 3:
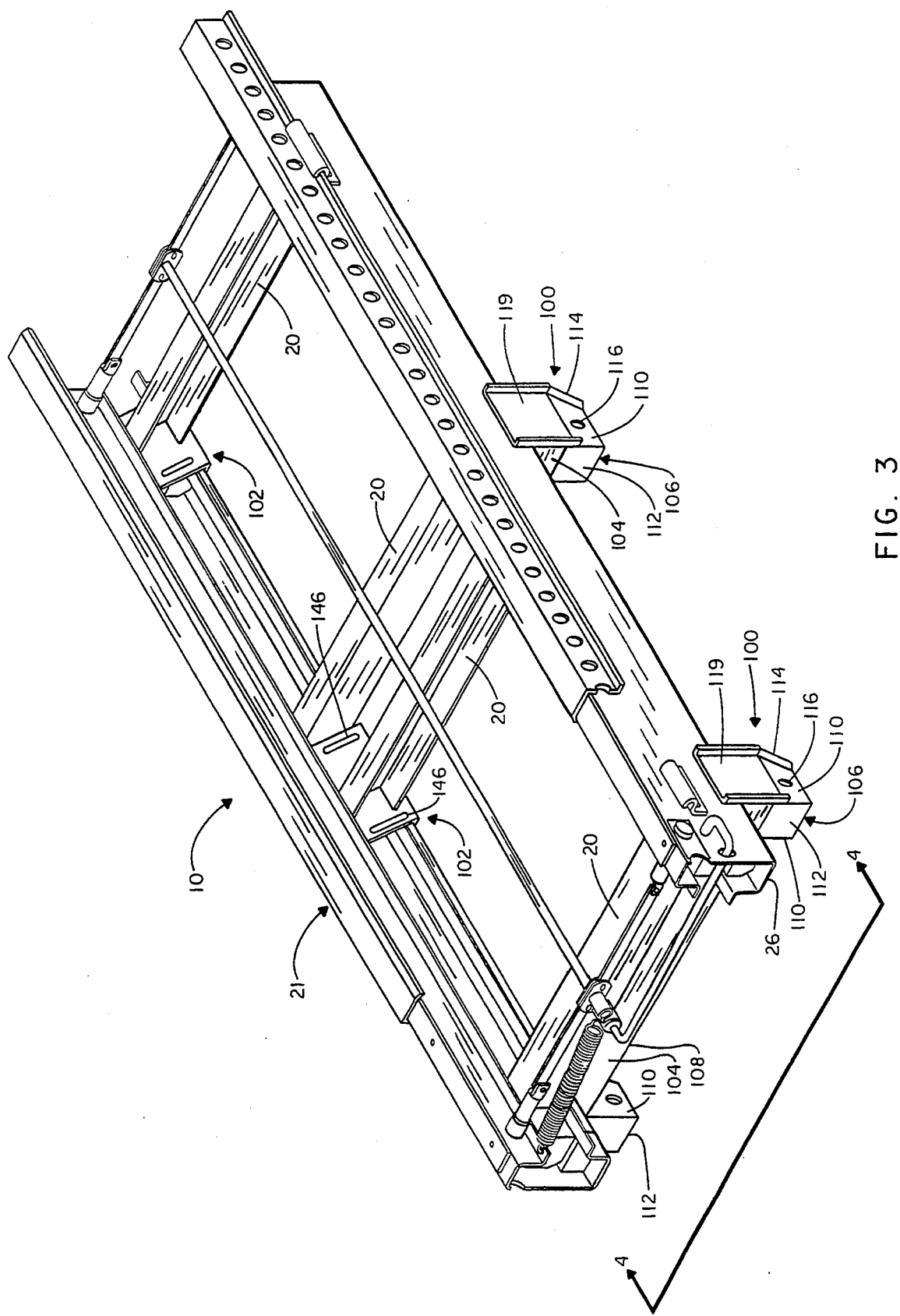
FIG. 3 is an isometric view of a subframe of a slider with brackets for mounting a trailing arm air suspension to the subframe in accordance with the invention.
Figure 4:
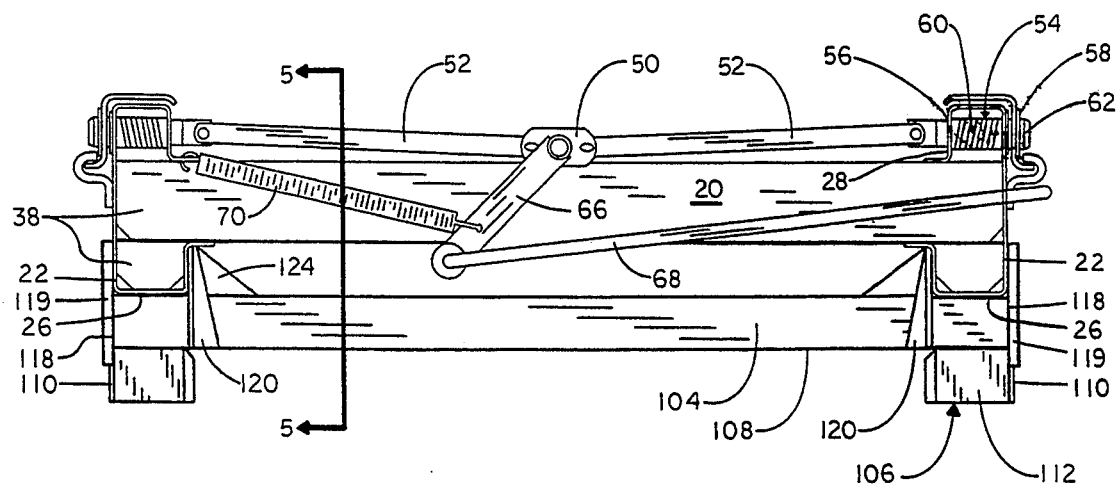
FIG. 4 is a front view of the slider of FIG. 3 taken along lines 4—4.
Figure 5:
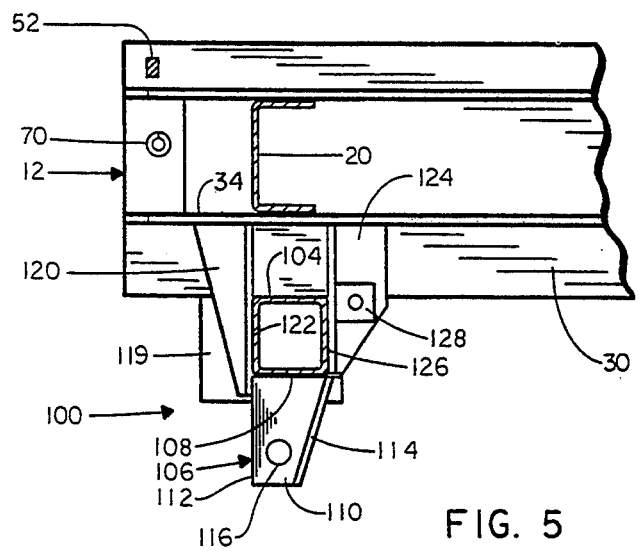
FIG. 5 is an elevational view of a hanger bracket mounted to the subframe and taken along lines 5—5 of FIG. 4.

As shown best in FIGS. 3 through 5, the hanger bracket assembly 100 comprises a box beam 104 which extends across the bottom of the slider 10 and is welded to the bottom walls 26 of the opposing frame rails 12. In the embodiment shown, the box beam 104 is disposed directly beneath a frontward cross beam 20. A hanger bracket 106, which is shorter than a conventional hanger bracket of the prior art, is welded to a bottom surface 108 of the box beam 104 at each end thereof. Each hanger bracket 106 comprises a U-shaped bracket having rearwardly extending arms 110 integrally connected to each other by a web 112. Preferably, the arms 110 and the web 112 are welded to the bottom surface 108. Stiffener flanges 114 are provided at the distal end of each arm 110. A pair of apertures 116 in each arm are in registry with each other and adapted to receive a bushed connection with a trailing arm (not shown in FIGS. 3 through 5, but illustrated in FIG. 7) in a conventional manner. As shown in FIG. 4, it can be seen that the side wall 22 of the frame rail 12, the end 118 of the box beam 104, and the outboard arm 110 of the hanger bracket 106 are in vertical alignment. A channel gusset 119 is welded in this vertical alignment to the side wall 22, the end 118, and the outboard arm 110.

Figure 7:
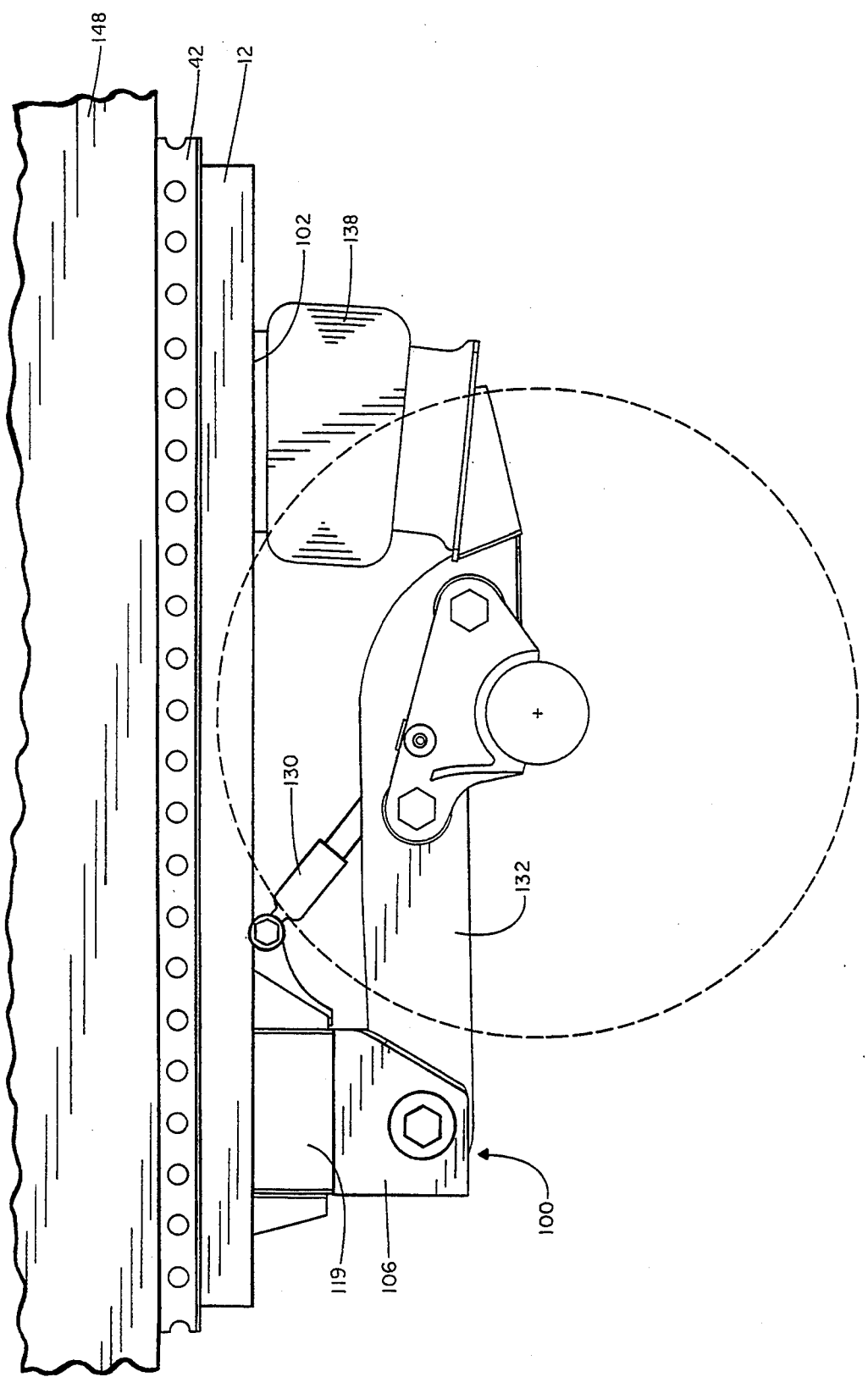
FIG. 7 is an elevational view of a trailing arm air suspension mounted to the subframe of a slider according to the invention.

Looking now at FIGS. 4 and 5, it can be seen that a forward gusset 120 is welded to and between the lower flange 30 of the frame rail 12 and a forward surface 122 of the box beam 104. Similarly, a rearward gusset 124 is welded to and between the lower flange 30 and a rearward surface 126 of the box beam 104. A mounting bracket 128 is fixed to the rearward gusset 124 to provide an upper mounting for a shock absorber (not shown in FIG. 5). As shown in FIG. 7, the shock absorber 130 extends between the mounting bracket 128 and the trailing arm 132.

Figure 6:
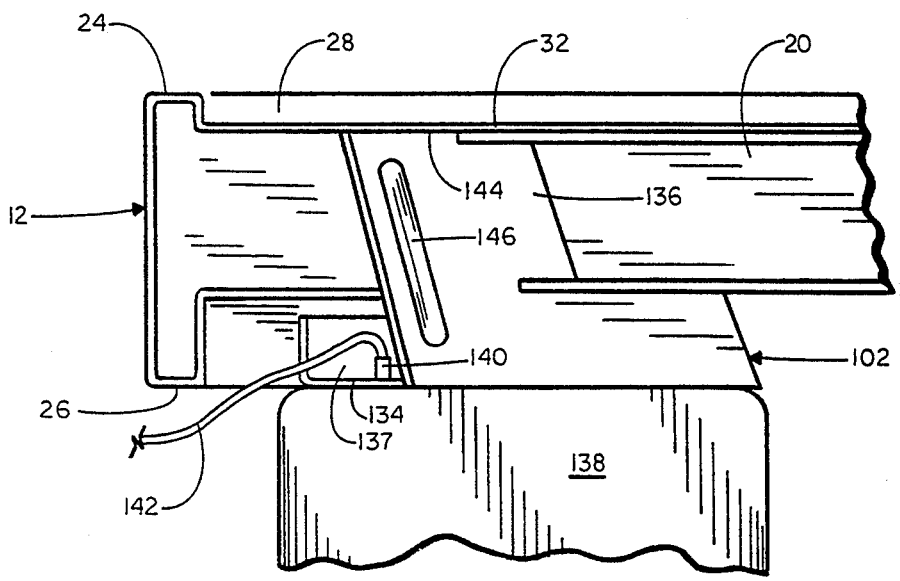
FIG. 6 is an isometric view of an air spring bracket according to the invention.

Turning now to FIG. 6, the air spring bracket 102 is angular in construction, having a substantially horizontal lower portion 134 and an upwardly angularly extending portion 136. A flange 137 on the lower portion 134 is welded to the lower flange 30 of the frame rail 12 so that the lower portion 134 extends inwardly of the frame rail to support the upper end of an air spring 138. A pneumatic port 140 in the lower portion 134 conducts air under pressure from a conduit 142 into the air spring 138. The upwardly extending portion 136 is cut out to extend around a cross beam 20 and may be welded thereto. In addition, an upper edge 144 of the upwardly extending portion 136 is welded to the upper lip 32 of the frame rail 12. It can be seen that the air spring bracket 102 extends inwardly of the subframe 21 and then upwardly toward an upper portion of each frame rail. The air spring 138 is offset from the centerline of the frame rail 12, thereby producing a bending moment about the frame rail 12. The upwardly extending portion 136 transfers the bending moment to the upper flange 28 of the frame rail 12. On the other hand, a top load on the top wall 24 of the frame rail 12 caused by the weight of the container resists the bending moment and braces the subframe 21. One or more ribs 146 on the upwardly extending portion 136 provide additional strength to the air spring bracket 102.

A complete suspension assembly according to the invention is illustrated in FIG. 7. A container 148 is mounted to the body rails 42 which are slidably received over the frame rails 12. The hanger bracket assembly 100 supports a pivotable connection to a trailing arm 132, and the air spring bracket 102 supports the upper end of an air spring 138 disposed between the free end of the trailing arm 132 and the frame rail 12. The hanger bracket assembly 100 and the air spring bracket 102 are constructed of lighter weight and thinner materials than the hanger brackets 72, 74 and support brackets 86, 90 of the prior art. This lighter weight plus the plurality of connections provided in the invention enables more flexibility in the connections between the subframe 21 and the suspension. Thus, with lighter weight and thinner parts, all pieces of the subframe 21 work together as a unit and are flexible. Strength is obtained by the flexibility of the connections rather than the thickness of the material. Further, stresses are equalized throughout the subframe 21 so that excessive lateral forces due to uneven loading can be more readily absorbed.

An improved slider 210 according to a second embodiment of the invention is illustrated in FIGS. 8 through 13. It has been found that because of the unique structure of the slider 210 of the second embodiment, three of the four cross beams 20 of the subframe 21 could be eliminated without suffering significant loss in strength of the subframe. Thus, an improved subframe 221 of the second embodiment is significantly lighter than the subframe of the first embodiment and the subframes of the prior art. This lighter weight, of course, translates into an increase in fuel economy for the tractor.

Figure 8:
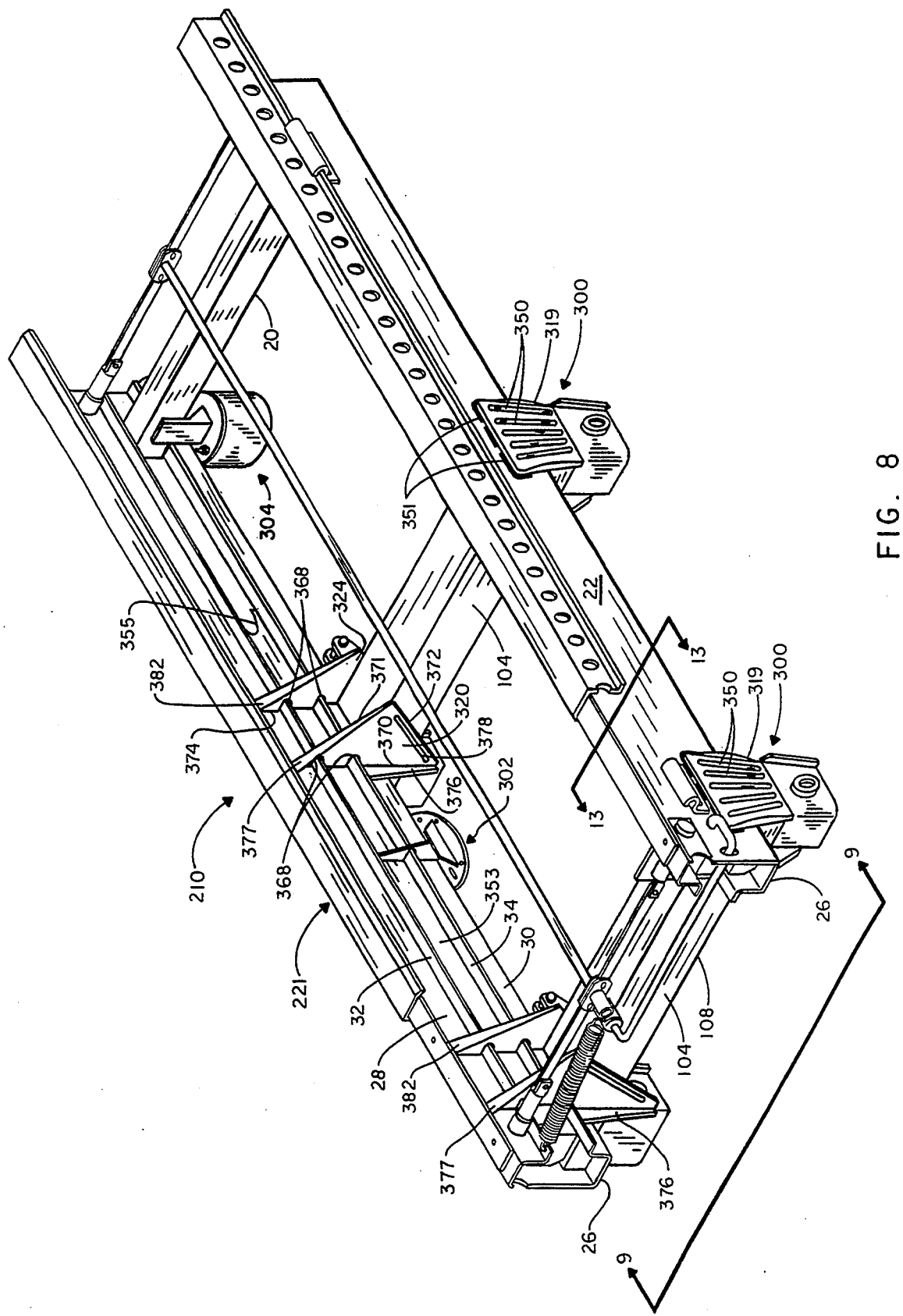
FIG. 8 is an isometric view of a subframe of a slider according to a second embodiment of the invention with brackets for mounting a trailing arm air suspension to the subframe.

It can be seen in FIG. 8 that the subframe 221 has a unique means for supporting the trailing arm air suspension. The means comprises two pairs of hanger bracket assemblies 300, a pair of first air spring brackets 302 and a pair of second air spring brackets 304 (only one of each air spring bracket 302, 304 can be seen in FIG. 8). Each axle (not shown) requires a pair of opposing hanger bracket assemblies 300 and a pair of the first air spring brackets 302 or a pair of the second air spring brackets 304. The subframe 221 includes a support plate 353 welded to and between the lips 32, 34 of the frame rail 12. The support plate effectively closes the channel in the frame rail 12 making the rail a box beam. It will be understood that the specific G-configuration of the rail 12 is not critical to the invention; a conventional box beam will suffice. It is important, however, that the frame rail 12 be structurally configured to resist torsional bending. Because G-shaped frame rails are most commonly used currently, the present embodiment is adapted to the G-configuration. Notches 355 at the ends of the support plate 353 provide a weld transition area to reduce stress at the weld points.

Looking now at FIGS. 8 through 10, each hanger bracket assembly 300 comprises the box beam 104 which extends across the bottom of the slider 210 and is suspended from the bottom walls 26 of the opposing frame rails 12 by several platelike gussets 319, 320 and 324. Unlike the first embodiment of the invention, the beam 104 is not welded directly to the frame rails 12. A hanger bracket, which is identical to the previously described hanger bracket 106, is welded to the bottom surface 108 of the box beam 104 at each end thereof. As shown in FIG. 9, the side wall 22 of the frame rail 12, the end 118 of the box beam 104, and the outboard arm 110 of the hanger bracket 106 are in vertical alignment. A plate gusset 319 is welded in this vertical alignment to the side wall 22, the end 118, and the outboard arm 110. Looking more particularly at FIG. 8, the plate gusset 319 is a fan-shaped plate having several ribs 350 which extend generally vertically and strengthen the plate. Preferably, the upper portion of the plate 319 has rounded corners at the top edge to facilitate a good weld at the juncture of the gusset with the side wall 22.

It will also be apparent that, unlike the channel gusset 119 in the earlier embodiment, the plate gusset 319 has shortened vertical flanges, each flange having a transition area where the flange blends into the edge of the gusset. This structure provides a little more flexibility to the gusset 319 than would be available with larger flanges while retaining some rigidity to resist lateral forces. Preferably, the plate gusset 319 has rounded corners at its upper end and may be arcuate. It is attached to the side wall 22 by three relatively short weldments 351 with two of the weldments extending around the cured corners. Thus, the box beam 104 is suspended from the opposing rails 12 by a plate gusset 319 on either side.

Looking again at FIGS. 8 through 10 and 13, additional support is provided for the box beam 104 at each frame rail 12 by a forward gusset 320 and a rearward gusset 324 which are positioned adjacent the forward surface 122 and the rearward surface 126, respectively, of each box beam 104.

Each of the gussets 320, 324 is generally triangular in shape, the forward gusset 320 having edges 370, 371, 372 and the rearward gusset 324 having edges 373, 374, and 375. The forward gusset edge 370 has two cutout portions 368, one of which accommodates the lip 34 of the lower flange 30 of the frame rail 12 and the other which accommodates the lip 32 of the upper flange. Beneath the cutout portions 368, a flange 376 projects from the edge 370. Similarly, a flange 377 projects from the edge 371. The edge 372 has no flange, but a dimple or rib 378 extends on the gusset 320 near and parallel to the edge 372.

As shown in FIG. 9, the forward gusset 320 has edge 372 welded to the forward surface 122 of the box beam 104; also, edge 370 is welded to the web 112 of the hanger bracket 106, the forward surface 122 of the box beam, and the support plate 353. The flange 376 is welded to the intersection of the lower lip 34 and the lower flange 30 of the frame rail 12. Additionally, an upper end of the flange 377 is welded to the upper flange 28 of the frame rail.

Figure 13:
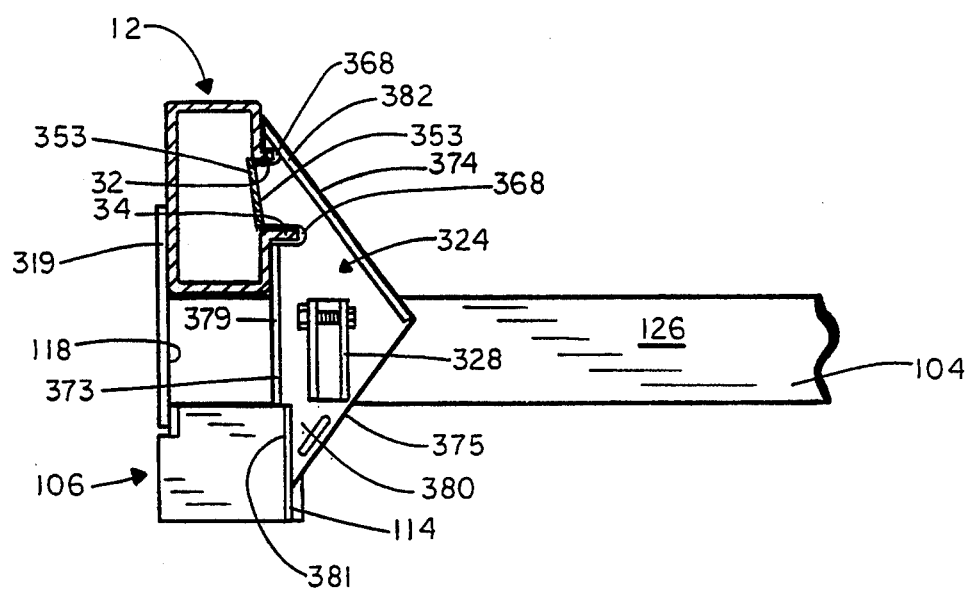
FIG. 13 is an elevational view of a rearward gusset of FIG. 8 taken along lines 13—13 thereof.

In like manner, as shown in FIG. 13, the rearward gusset edge 373 has two cutout portions 368 to accommodate the lips 32, 34 of the frame rail 12 and also includes a flange 379 projecting therefrom. A lower portion 380 of the rearward gusset 324 includes a cutout portion 381 to accommodate the rearward open end of the hanger bracket 106. The edge 374 has a flange 382 projecting therefrom. The rearward gusset 324 has edge 373 welded to the rearward surface 126 of the box beam 104 and the support plate 353. The flange 379 is welded to the intersection of the lower lip 34 and the lower flange 30 of the frame rail 12. The edge 375 is welded to the rearward surface 126 of the box beam, and an upper portion of flange 382 is welded to the upper flange 28 of the frame rail. In addition, the lower portion 380 is welded to one of the flanges 114 of the hanger bracket 106. A mounting bracket 328 is fixed to rearward gusset 324 to provide an upper mounting for a shock absorber in a conventional manner as described above with respect to the first embodiment. Preferably, the bracket 328 will have a vertical dimension substantially equivalent to the height of the surface 126. The top and bottom edges of the bracket 328 are welded to the gusset 324, and backup welds are disposed on the opposite surface of the gusset, directly opposite the top and bottom edges. These points should be at the junction of the gusset 324 with the rearward surface 126.

Figure 11:
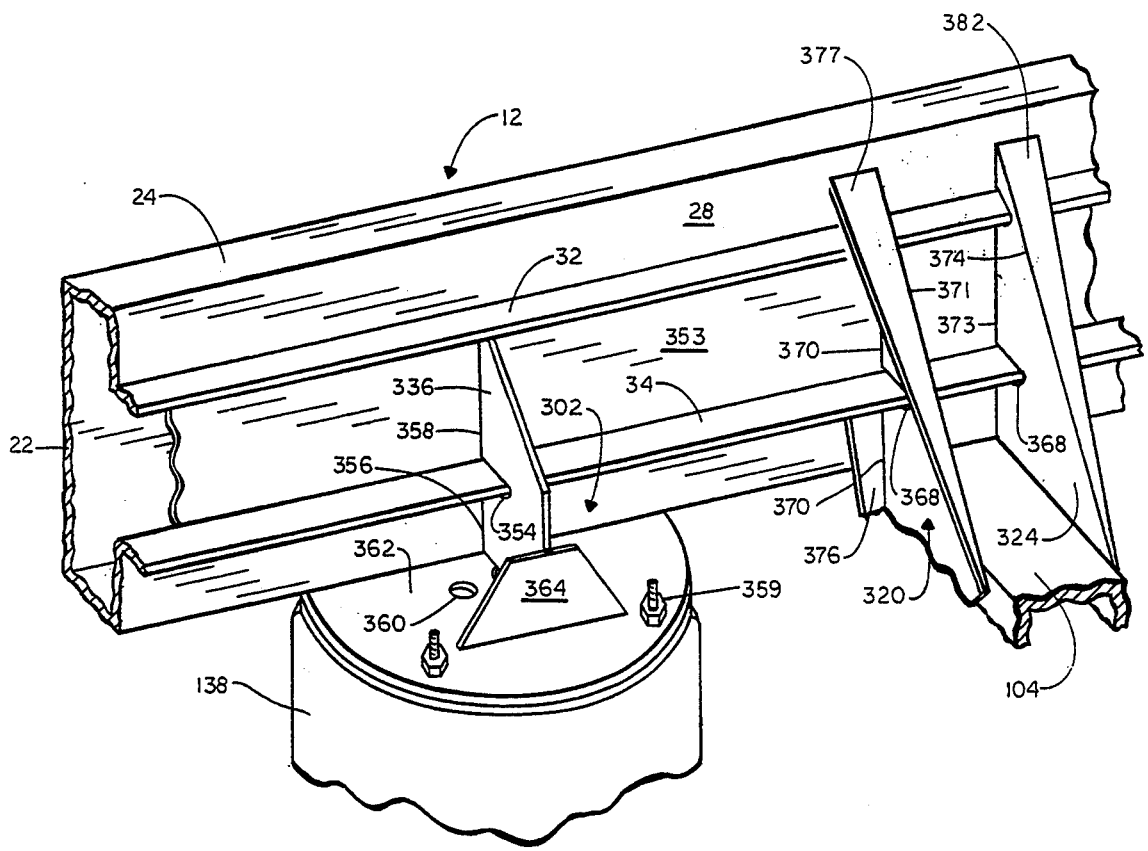
FIG. 11 is an isometric view of a forward gusset and a first air spring bracket mounted to the subframe in accordance with the second embodiment of the invention.

Referring now to FIG. 11, the first air spring bracket 302 supports the upper end of the air spring 138 and is fastened thereto by fasteners such as nuts 359. The first air spring bracket 302 comprises a substantially horizontal lower plate 362, one upwardly extending plate 336 welded to the lower plate 362, and a vertically disposed brace plate 364 welded to the lower plate 362 and to the upwardly extending plate 336. The upwardly extending plate 336 includes a cutout portion 354 which is adapted to receive the lip 34 of the frame rail 12. The plate 336 also includes two vertically disposed end edges 356, 358. The end edge 356 is welded to the lower flange 30 of the frame rail 12, while the end edge 358 is welded to the support plate 353. In a similar manner as shown in FIG. 6 and described above with respect to the lower portion 134 of the air spring bracket 102 of the first embodiment, the lower plate 362 includes an aperture 360 which is adapted to receive the pneumatic port 140 for conducting air under pressure from the conduit 142 into the air spring 138.

The lower plate 362 of the first air spring bracket 302 is centered inwardly of the side 22 of the frame rail 12 to support the air spring 138 which is offset inwardly from the side 22. Because the air spring 138 and the air spring bracket 302 are centered inwardly from the side 22 of the frame rail 12, a bending moment is thereby produced. The upwardly extending plate 336 transfers the bending moment to the frame rail 12. However, a top load on the top wall 24 of the frame rail 12 caused by the weight of the container 148 (shown in FIG. 7) resists the bending moment and braces the subframe 221. The brace 364 provides strength and flexibility to the air spring bracket 302 and assists in the transfer of bending moment stresses from the lower plate 362 to the upwardly extending plate 336 and then to the frame rail 12.

Figure 12:
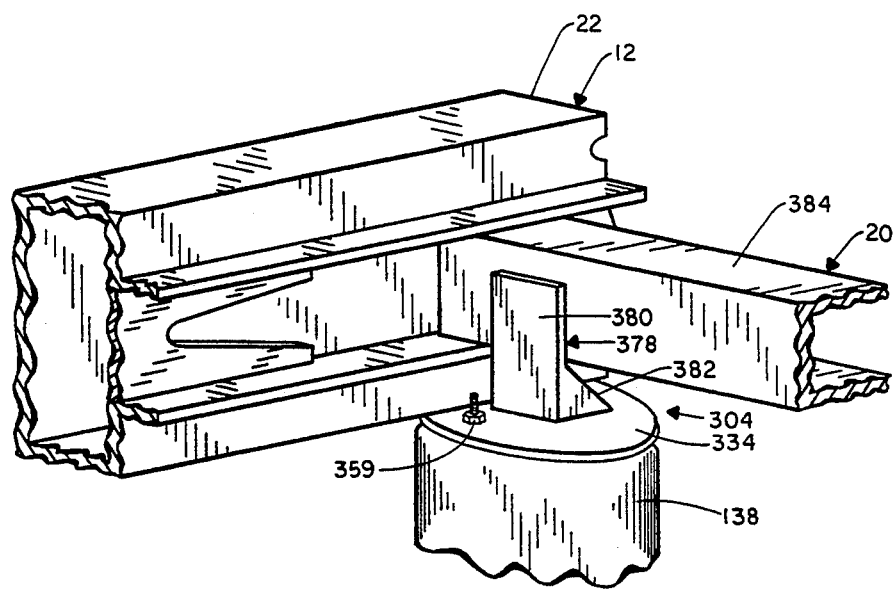
FIG. 12 is a rear isometric view of a second air spring bracket mounted to the subframe in accordance with the second embodiment of the invention.

Turning now to FIG. 12, the second air spring bracket 304 supports the upper end of the air spring 138 and is fastened thereto in conventional manner by fasteners such as the nuts 359. The second air spring bracket 304 comprises a substantially horizontal lower plate 334 and a bracket 378 having a vertical leg 380 and a supporting gusset 382 welded to the lower plate 334. The legs 380 and gusset 382 are disposed at an approximate right angle with respect to each other. The leg 380 is welded to a surface 384 of the cross beam 20. Unlike the first air spring bracket 302, however, the plate 334 is also welded to the bottom wall 26 of the frame rail 12.

It can be seen that the lower plate 334 of the second air spring bracket 304 is centered inwardly of the side 22 of the frame rail 12 to support the air spring 138 which is offset inwardly from the side 22. Because the air spring 138 and the air spring bracket 304 are centered inwardly from the side 22 of the frame rail 12, a bending moment about the frame rails 12 is thereby produced. The bracket 378 transfers the bending moment to the cross beam 20 which in turn communicates the bending moment to the frame rail 12.

It will be apparent from this construction that all vertical and lateral loads on the subframe 221 are transmitted to and from the trailing arms and the wheels solely through the gussets 319, 320, and 324 and brackets 302 and 304. For example, vertical load is transferred to the top of the frame rail 12 by the gusset 319, the air spring brackets 302, 304, and to a lesser extent, the edges 370, 373 of the forward and rearward gussets 320, 324, respectively. Closing the frame rail 12 by support plate 353 facilitates the transfer of vertical load.

In like manner, the gussets 320, 324 primarily serve to transfer lateral load to the top of the frame rail 12. Lateral load is borne principally through flanges 377 and 382. Also, it can be seen that lateral load is transferred from a hanger bracket on one side of the suspension through the beam 104 and the gussets 319, 320, and 324 to the frame rail on the opposite side. Moments on the frame rails 12 are carried by the air spring brackets 302, 304.

A complete suspension assembly constructed according to the second embodiment has benefits analogous to those of the first embodiment of the invention illustrated in FIG. 7. The hanger bracket assemblies 300 and the air spring brackets 302, 304 can be constructed of lighter weight materials than the hanger brackets 72, 74 and support brackets 86, 90 of the prior art. Also, the total weight of the subframe 221 is much lighter than prior art subframes and the subframe of the first embodiment because of the elimination of three cross beams. In addition, the plurality of connections provided in the second embodiment of the invention enables even more flexibility in the subframe 221 than the subframe of the first embodiment without loss of lateral stability. Thus, the subframe 221 is even less expensive to produce than the subframe of the first embodiment. The result is a stronger, lighter weight, easily adaptable, lower cost slider subframe assembly than was previously available with the prior art.

It will be understood that reasonable variation and modification of the foregoing embodiments according to the invention are possible within the scope of the foregoing disclosure and drawings without departing from the spirit of the invention as defined in the appended claims.

The embodiments of the invention in which an exclusive property or privilege is claimed are defined as follows:

1. In a slider comprising a subframe and a trailing arm air spring suspension, the subframe having a pair of parallel frame rails, the improvement comprising:
    a beam disposed beneath the frame rails and extending from one frame rail to the other of the frame rails, said beam having a bottom surface and a front surface;
    a hanger bracket having an upper portion thereof mounted to the bottom surface of one end of the beam beneath one frame rail and adapted to pivotably mount the trailing arm;
    a beam-frame rail connection between the beam and the frame rail to transfer lateral loads from the hanger bracket to the other frame rail, the beam-frame rail connection comprising a first gusset mounted to the front surface, the hanger bracket, and the one frame rail, the one frame rail having an inner wall and the first gusset being triangular in shape having first, second, and third edges, the first edge extending from the inner wall toward the hanger bracket, the second edge extending from the hanger bracket toward a point on the front surface, and the third edge extending from said point on the front surface toward the inner wall.

2. The slider according to claim 1 wherein the first edge is welded to the inner wall and the hangar bracket, the second edge is welded to the hangar bracket and the front surface, and the third edge is welded to the front surface.

3. The Slider according to claim 1 wherein a flange extends normally from the first edge.

4. The slider according to claim 1 wherein a flange extends normally from the third edge.

5. The slider according to claim 1 wherein a rib extends near to and substantially parallel with the second edge.

6. A slider according to claim 1 wherein the one frame rail has an outer wall, and the beam-frame rail connection comprises a second gusset mounted to the end of the beam, the hanger bracket, and the outer wall of the one frame rail, whereby the first and second gussets are adapted to transfer loads between the subframe and the suspension.

7. The slider according to claim 6 wherein the second gusset is substantially planar, said gusset being coplanar with the outer wall and having an upper portion, an intermediate portion, and a lower portion, the upper portion being welded to the outer wall, the intermediate portion being welded to the end of the beam, and the lower portion being welded to the hanger bracket.

8. The slider according to claim 7 wherein at least one rib extends between the upper portion and the lower portion of the second gusset.

9. The slider according to claim 6 wherein the beam has a rearward surface and the beam-frame rail connection comprises a third gusset mounted to the rearward surface, the hanger bracket, and the one frame rail.

10. The slider according to claim 9 wherein the third gusset is triangular in shape having first, second, and third edges, the first edge extending from the inner wall toward the hanger bracket, the second edge extending from the hangar bracket toward a point on the rearward surface, and the third edge extending from said point on the rearward surface toward the inner wall.

11. The slider according to claim 10 wherein the first edge is welded to the inner wall and the hangar bracket, the second ,edge is welded to the hangar bracket and the front surface, and the third edge is welded to the front surface.

12. The slider according to claim 10 wherein a flange extends normally from the first edge.

13. The slider according to claim 10 wherein a flange extends normally from the third edge.

14. The slider according to claim 10 wherein a rib extends near to and substantially parallel with the second edge.

15. The slider according to claim 10 wherein the first edge has a cutout portion.

16. The slider according to claim 10 wherein a shock absorber mounting bracket extends rearwardly from the third gusset.

17. The slider according to claim 1 wherein each of the frame rails is a closed box beam.

* * * * *